United States Patent
Fujiwara

(10) Patent No.: US 9,598,044 B2
(45) Date of Patent: Mar. 21, 2017

(54) FAR SIDE AIRBAG DEVICE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/925,434

(22) Filed: Oct. 28, 2015

(65) Prior Publication Data
US 2016/0129876 A1  May 12, 2016

(30) Foreign Application Priority Data
Nov. 6, 2014 (JP) .................................. 2014-226396

(51) Int. Cl.
| | | |
|---|---|---|
| B60R 21/207 | (2006.01) | |
| B60R 21/231 | (2011.01) | |
| B60R 21/233 | (2006.01) | |
| B60R 21/2334 | (2011.01) | |
| B60R 21/2338 | (2011.01) | |

(52) U.S. Cl.
CPC .......... *B60R 21/233* (2013.01); *B60R 21/207* (2013.01); *B60R 21/2334* (2013.01); *B60R 21/2338* (2013.01); *B60R 21/23138* (2013.01); *B60R 2021/23146* (2013.01); *B60R 2021/23161* (2013.01); *B60R 2021/23308* (2013.01); *B60R 2021/23316* (2013.01); *B60R 2021/23382* (2013.01)

(58) Field of Classification Search
CPC ............ B60R 21/207; B60R 21/23138; B60R 21/233; B60R 21/2334; B60R 21/2338; B60R 2021/0048; B60R 2021/23146; B60R 2021/23161; B60R 2021/23308; B60R 2021/23316; B60R 2021/23382
See application file for complete search history.

(56) References Cited

U.S. PATENT DOCUMENTS

| | | | | |
|---|---|---|---|---|
| 5,499,840 | A * | 3/1996 | Nakano | B60N 2/0705 280/730.1 |
| 5,615,909 | A * | 4/1997 | Wipasuramonton | B60R 21/207 280/730.2 |
| 5,718,450 | A * | 2/1998 | Hurford | B60R 21/23138 280/730.2 |

(Continued)

FOREIGN PATENT DOCUMENTS

| | | | |
|---|---|---|---|
| JP | 2001287613 A | * | 10/2001 |
| JP | 2006-008016 A | | 1/2006 |

(Continued)

*Primary Examiner* — Laura Freedman
(74) *Attorney, Agent, or Firm* — Oliff PLC

(57) ABSTRACT

A far side airbag device includes: a side airbag that is configured to receive a gas supply and, while being supported at a seatback of a seat, expand and inflate at a vehicle width direction middle side relative to a range at least from the chest to the head of an occupant of the seat; and a limiting structure that limits a thickness in the vehicle width direction of the side airbag in an inflated and expanded state such that a region that inflates and expands at the vehicle width direction middle side relative to the head of a small occupant is thinner than a region that inflates and expands at the vehicle width direction middle side relative to the head of a large occupant.

4 Claims, 13 Drawing Sheets

(56) References Cited

U.S. PATENT DOCUMENTS

| | | | | |
|---|---|---|---|---|
| 5,913,536 A * | 6/1999 | Brown | B60R 21/207 | 280/728.2 |
| 6,142,507 A * | 11/2000 | Okuda | B60R 21/23138 | 280/730.2 |
| 7,971,901 B2 * | 7/2011 | Tomitaka | B60R 21/207 | 280/730.2 |
| 7,976,058 B2 * | 7/2011 | Suzuki | B60R 21/23138 | 280/729 |
| 8,388,019 B2 * | 3/2013 | Wipasuramonton | B60R 21/23138 | 280/730.2 |
| 8,448,981 B2 * | 5/2013 | Fukawatase | B60R 21/207 | 280/730.2 |
| 8,474,863 B2 * | 7/2013 | Rick | B60R 21/23138 | 280/729 |
| 8,480,123 B2 * | 7/2013 | Choi | B60R 21/231 | 280/730.1 |
| 8,684,408 B2 * | 4/2014 | Thomas | B60R 21/231 | 280/730.2 |
| 9,290,151 B2 * | 3/2016 | Fujiwara | B60R 21/231 | |
| 9,296,357 B2 * | 3/2016 | Fujiwara | B60R 21/207 | |
| 9,376,083 B2 * | 6/2016 | Yamanaka | B60R 21/23138 | |
| 2006/0001244 A1 | 1/2006 | Taguchi et al. | | |
| 2006/0131845 A1 * | 6/2006 | Belwafa | B60R 21/23138 | 280/729 |
| 2006/0131847 A1 | 6/2006 | Sato et al. | | |
| 2015/0343985 A1 * | 12/2015 | Sugimoto | B60R 21/23138 | 280/730.2 |
| 2016/0031407 A1 * | 2/2016 | Yamanaka | B60R 21/233 | 280/728.2 |
| 2016/0114755 A1 * | 4/2016 | Matsuzaki | B60R 21/207 | 280/730.2 |

FOREIGN PATENT DOCUMENTS

| | | | |
|---|---|---|---|
| JP | 2006-008064 A | | 1/2006 |
| JP | 2006-008105 A | | 1/2006 |
| JP | 2006-082664 A | | 3/2006 |
| JP | 2009154709 A | * | 7/2009 |
| JP | 2010070003 A | * | 4/2010 |
| JP | 2012071723 A | * | 4/2012 |
| JP | 2016-010984 A | | 1/2016 |
| JP | 2016-083955 A | | 5/2016 |

* cited by examiner

FAR SIDE AIRBAG DEVICE

CROSS-REFERENCE TO RELATED APPLICATION

This application is based on and claims priority under 35 USC 119 from Japanese Patent Application No. 2014-226396 filed on Nov. 6, 2014, the disclosure of which is incorporated by reference herein.

BACKGROUND

Technical Field

The present invention relates to a far side airbag device.

Related Art

Among far side airbag devices for protecting an occupant against a side impact from a vehicle width direction outer side, a structure is known that is provided with a front and rear pair of tethers with different lengths in a region that inflates and expands to sideward of the head of the occupant (for example, see Japanese Patent Application Laid-Open (JP-A) No. 2006-082664 (FIG. 1) and JP-A No. 2006-008064 (FIG. 8)).

However, energy absorption amounts that are required of a far side airbag that inflates and expands at the vehicle width direction middle side relative to an occupant when protecting the head differ between large occupants and small occupants. Thus, there is scope for improvement in providing head protection performance that accords with differences in the statures of occupants.

SUMMARY

The present disclosure provides a far side airbag device that may suppress the effect of differences in the statures of occupants on occupant head protection performance of a far side airbag.

An aspect of the present invention is a far side airbag device including a side airbag that is configured to receive a gas supply and, while being supported at a seatback of a seat, expand and inflate at a vehicle width direction middle side relative to a range at least from the chest to the head of an occupant of the seat; and a limiting structure that limits a thickness in the vehicle width direction of the side airbag in an inflated and expanded state such that a region that inflates and expands at the vehicle width direction middle side relative to the head of a small occupant is thinner than a region that inflates and expands at the vehicle width direction middle side relative to the head of a large occupant.

In this far side airbag device, when, for example, there is a side impact against a vehicle side portion at the opposite side in the vehicle width direction from a side at which the seat is disposed, the side airbag receives a supply of gas and inflates and expands. A movement of the occupant sitting on the seat toward the impact side is limited by this side airbag. Because the limiting structure is provided at the region of the side airbag that inflates and expands at the vehicle width direction middle side relative to the head of the occupant (which region may hereinafter be referred to as "the head protection portion"), an expansion thickness of the head protection portion of the side airbag is limited. Therefore, internal pressure is kept higher in the head protection portion than in a structure that is not provided with the limiting structure, and energy absorption performance of the far side airbag when the far side airbag is restraining the head is excellent. The expansion thickness of the side airbag is greater at the head protection portion for a large occupant than at the head protection portion for a small occupant. Therefore, an energy absorption stroke may be assured for the head of a large occupant, for whom an energy absorption amount is larger than for a small occupant.

Thus, the structure of the present aspect may suppress the effect of differences in the statures of occupants on occupant head protection performance of the far side airbag.

In the aspect described above, the limiting structure may include: a first side wall joining portion that extends in a vehicle up-down direction in the inflated and expanded state of the side airbag and joins vehicle width direction side walls of the side airbag to one another; and a second side wall joining portion that connects with a lower end of the first side wall joining portion and joins the side walls to one another over a larger range in a vehicle front-rear direction than the first side wall joining portion.

In this far side airbag device, the expansion thicknesses of the head protection portion are limited by the first and second side wall joining portions. A difference in expansion thicknesses between the head protection portion for small occupants and the head protection portion for large occupants is principally set by the second side wall joining portion. Thus, the limiting structure may be constituted with a simple structure.

In the aspect described above, the first side wall joining portion may be provided as a pair of the first side wall joining portion arranged in the vehicle front-rear direction in the inflated and expanded state of the side airbag, and the second side wall joining portion may be provided as a pair of the second side wall joining portion connecting with the lower ends of the pair of first side wall joining portions.

In this far side airbag device, the first side wall joining portion and the second side wall joining portion are respectively provided in pairs at front and rear. Therefore, the head protection portion may be expanded to a shape that is more suitable for protecting heads than in, for example, a structure in which only one each of the first and second side wall joining portions are provided.

In the present aspect, the pair of first side wall joining portions may extend in parallel with one another in a side view or may be angled such that the lower ends are closer to one another in the vehicle front-rear direction than upper ends thereof.

In this far side airbag device, the first side wall joining portions that respectively extend in the vehicle up-down direction extend in parallel with one another or are angled such that the lower ends thereof are closer to one another in the vehicle front-rear direction than the upper ends thereof. Therefore, with a simple structure, the head protection portion may be expanded to a more suitable shape for the protection of heads.

In the present aspect, the limiting structure may further include a third side wall joining portion that joins the side walls to one another at a location that is distant from the first side wall joining portion and the second side wall joining portion.

In this far side airbag device, the difference in expansion thickness between the head protection portion for small occupants and the head protection portion for large occupants is principally set by the second and third side wall joining portions. Therefore, the head protection portion may be expanded to a shape that is more suitable for the protection of heads than in, for example, a structure in which the third side wall joining portion is not provided.

In the aspect described above, the limiting structure may include: a front and rear pair of side wall joining portions that extend in a vehicle up-down direction and are arranged in a vehicle front-rear direction in the inflated and expanded state of the side airbag, and that join vehicle width direction side walls of the side airbag to one another; and a separation setting portion that makes a separation in the vehicle front-rear direction between lower ends of the pair of side wall joining portions smaller than a separation between upper end sides of the same.

In this far side airbag device, expansion thicknesses of the head protection portion are limited principally by the pair of side wall joining portions, and the difference in expansion thicknesses between the head protection portion for small occupants and the head protection portion for large occupants is principally set by the separation setting portion. Thus, the limiting structure may be constituted with a simple structure.

In the aspect described above, the pair of side wall joining portions may include:

a pair of up-and-down seams that join the vehicle width direction side walls of the side airbag to one another by stitching; and ring seams that are formed in ring shapes respectively connecting with the lower ends of the pair of up-and-down seams in a side view, and that join the vehicle width direction side walls of the side airbag to one another by stitching, and the separation setting portion may be configured by at least one of the ring seams projecting in the vehicle front-rear direction toward the side thereof at which the up-and-down seam that connects with the other ring seam is disposed.

In this far side airbag device, the expansion thicknesses of the head protection portion are limited by the pairs of up-down seams and ring seams, and the difference in expansion thicknesses between the head protection portion for small occupants and the head protection portion for large occupants is principally set by the separation of the ring seams. Thus, the separation setting portion is configured by using the ring seams, which may suppress concentrations of stress at the lower ends of the up-and-down seams.

In the aspect described above, the pair of side wall joining portions may be a pair of up-and-down seams that join the vehicle width direction side walls of the side airbag to one another by stitching, and the separation setting portion may include a seam arrangement structure in which at least one of the pair of up-and-down seams is angled such that the lower ends of the pair of up-and-down seams are closer in the vehicle front-rear direction than the upper ends.

In this far side airbag device, the expansion thicknesses of the head protection portion are limited and the difference in expansion thicknesses between the head protection portion for small occupants and the head protection portion for large occupants is set by the pair of seams of which at least one is angled with respect to the vehicle up-down direction.

In the aspect described above, the limiting structure may include a tether that extends in a vehicle front-rear direction and joins vehicle width direction side walls of the side airbag to one another in a region that inflates and expands at the vehicle width direction middle side relative to the head of a small occupant.

In this far side airbag device, the expansion thicknesses of the head protection portion are limited and the difference in expansion thicknesses between the head protection portion for small occupants and the head protection portion for large occupants is set by one or a plural number of the tether extending in the vehicle front-rear direction. Thus, the limiting structure may be constituted with a simple structure.

In the above aspect, a central position of the second side wall joining portion in a side view may be disposed at a position in the up-down direction that corresponds with a center of gravity of the head of a small occupant.

The above structure may suppress the effect of differences in the statures of occupants on occupant head protection performance of the far side airbag.

In the above aspect, up-down direction positions of the lower ends of the pair of first side wall joining portions may be different from one another, and a central position in a side view of the second side wall joining portion that connects with the lower end of one of the first side wall joining portions may be disposed at a position in the up-down direction that corresponds with a center of gravity of the head of a small occupant.

The above structure may also suppress the effect of differences in the statures of occupants on occupant head protection performance of the far side airbag.

As described above, the far side airbag device according to the present disclosure provides an excellent effect in that the effect of differences in the statures of occupants on occupant head protection performance of the far side airbag may be suppressed.

BRIEF DESCRIPTION OF THE DRAWINGS

Exemplary embodiments of the present invention will be described in detail based on the following figures, wherein.

DETAILED DESCRIPTION

=First Exemplary Embodiment=

Figure 1:
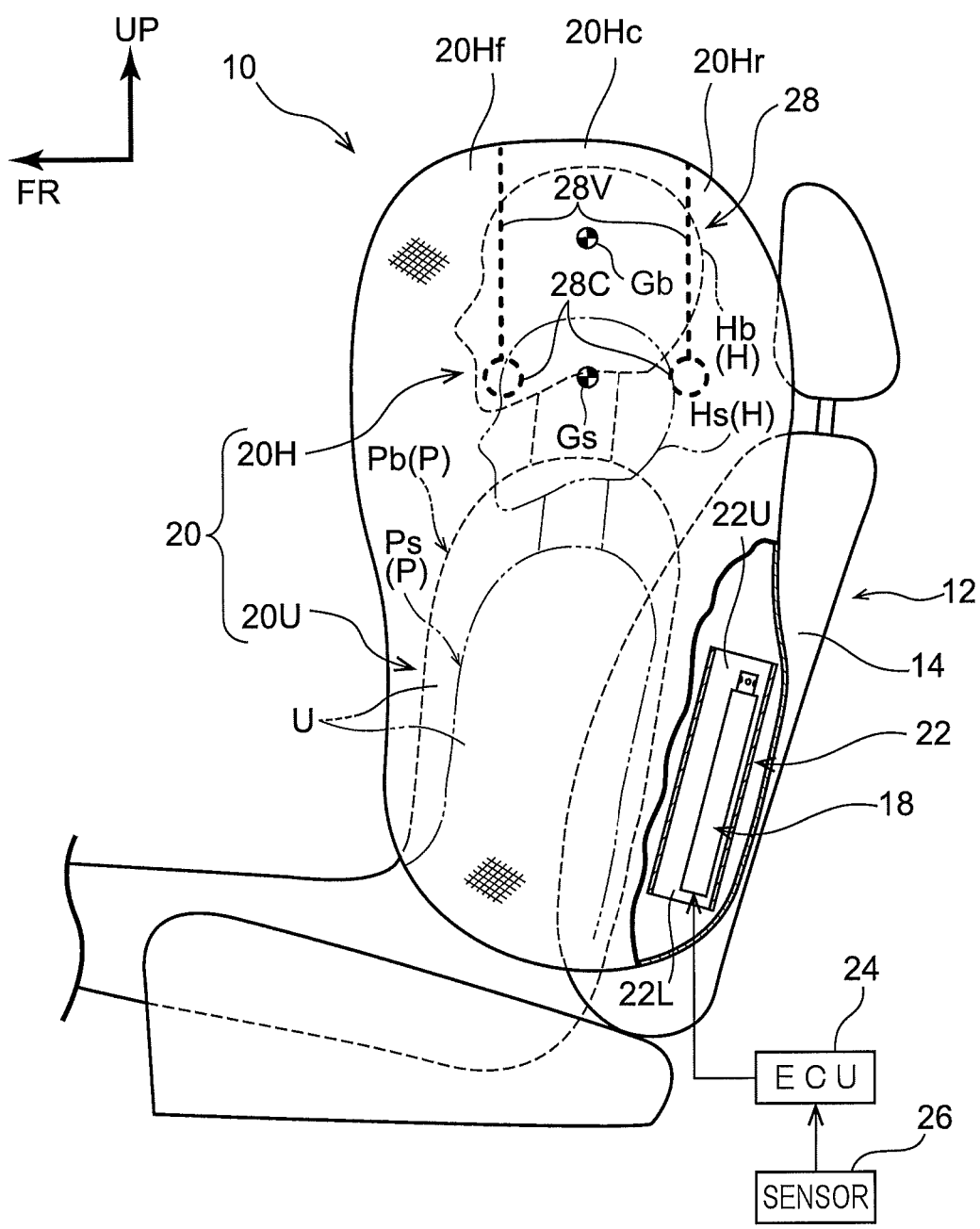
FIG. 1 is a side view illustrating a partial cutaway of schematic overall structure of a far side airbag device of a first exemplary embodiment of the present disclosure, in which an inflated and expanded state of a side airbag is viewed from a vehicle width direction middle side thereof.

A far side airbag device 10 according to a first exemplary embodiment is described in accordance with FIG. 1 to FIG. 4B. An arrow FR, an arrow UP and an arrow IN that are marked in the drawings indicate, respectively, a forward direction of the vehicle, an upward direction and a middle side in the vehicle width direction. Herebelow, where descriptions are given using the directions front, rear, up, down, left and right, unless particularly specified, these represent the vehicle front-rear direction, the vehicle up-down (vertical) direction, and left and right directions when facing forward in the vehicle front-rear direction.

—General Structure of Vehicle Cabin Interior—

As illustrated in FIG. 1, a vehicle seat 12 that serves as a seat is disposed in a vehicle cabin of an automobile in which a far side airbag device 10 is employed. The vehicle seat 12 is disposed to be offset in the vehicle width direction relative to the vehicle width direction center of the vehicle cabin interior. As is described in detail below, the far side airbag device 10 is installed in a side portion of a seatback 14 of the vehicle seat 12 that is at the vehicle center side thereof in the vehicle width direction.

In this exemplary embodiment, the vehicle seat 12 is a front seat (a first row seat), which is to say a driver seat or a passenger seat. A front-rear direction, up-down direction and width (left-right) direction of the vehicle seat 12 coincide with the front-rear direction, up-down direction and vehicle width direction of the automobile.

In this exemplary embodiment, the vehicle seat 12 is disposed at the right side relative to the vehicle width direction center of the vehicle cabin. Although not illustrated in the drawings, another vehicle seat (a passenger seat or a driver seat) is disposed at the left side relative to the vehicle width direction center of the vehicle cabin. A center console is disposed between the vehicle seat 12 and the another vehicle seat (i.e., between the driver seat and the passenger seat). That is, the automobile in which the far side airbag device 10 is employed has no middle seat disposed between the driver seat and the passenger seat. A structure that is not provided with the center console (for example, a structure in which there is a passageway between the left and right vehicle seats 12) is also applicable.

—General Overall Structure of the Far Side Airbag Device—

The far side airbag device 10 limits movement of an occupant P of the vehicle seat 12 toward the impact side when there is a side impact against the opposite side in the vehicle width direction from the side at which the vehicle seat 12 is disposed (a far side relative to the occupant P). That is, the far side airbag device 10 restrains the occupant P from the impact side thereof when there is a side impact against the far side. This is described in specific terms below.

The far side airbag device 10 is provided with an inflator 18 and a side airbag 20. The inflator 18 serves as a gas generation device. The side airbag 20 receives a gas supply from the inflator 18 and inflates and expands. In this exemplary embodiment, the far side airbag device 10 is further provided with a flow regulation cloth 22 provided inside the side airbag 20.

The far side airbag device 10 has a structure in which the side airbag 20, the flow regulation cloth 22, the inflator 18 and suchlike are formed into a module. In this exemplary embodiment, the side airbag 20 and the flow regulation cloth 22 are disposed (stowed) in a folded state in the side portion of the seatback 14 that is at the vehicle center side thereof in the vehicle width direction. In the descriptions below, unless particularly specified, references to the shapes of the side airbag 22 and the flow regulation cloth 22 refer to the shapes thereof in an inflated and expanded state.

As illustrated in FIG. 1, the side airbag 20 includes an upper body protection portion 20U and a head protection portion 20H. The upper body protection portion 20U inflates and expands at the vehicle width direction middle side relative to the upper body U (the chest, the abdomen and the like) of the occupant P. The head protection portion 20H inflates and expands at the vehicle width direction middle side relative to the head H of the occupant P. The upper body protection portion 20U forms a lower portion of the side airbag 20 and the head protection portion 20H forms an upper portion of the side airbag 20. An expansion limiting structure 28, which is described below, is provided at the head protection portion 20H. Thus, the side airbag 20 is configured to cover the head, chest and abdomen of the occupant P from the vehicle width direction middle side in a side view, and the side airbag 20 restrains an occupant P who is moving to the vehicle width direction middle side at each of the head, the chest and the abdomen.

The inflator 18 is a "cylinder-type" inflator. The inflator 18 is disposed in a rear portion of the side airbag 20 in an attitude such that a length direction of the inflator 18 is along a length direction of the seatback 14 in side view (substantially along the up-down direction).

The flow regulation cloth 22 is formed in a tubular shape with a length direction thereof substantially in the up-down direction, of a base cloth the same as a base cloth of the side airbag 20. The flow regulation cloth 22 is disposed in the rear portion of the side airbag 20 in the state in which the inflator 18 is accommodated therein. Openings 22U and 22L are formed in upper and lower ends of the flow regulation cloth 22, respectively. Consequently, gas that is generated by the inflator 18 passes through the upper and lower openings 22U and 22L of the flow regulation cloth 22 and is supplied into the side airbag 20. That is, the flow regulation cloth 22 is inflated and expanded into a circular tube shape by the gas from the inflator 18, and functions as a "diffuser".

The inflator 18 described above is electronically connected to an ECU 24, which is a control device. The ECU 24 is electronically connected to a sensor 26 that detects a side impact of the automobile in which the far side airbag device 10 is employed. The sensor 26 according to this exemplary embodiment is capable of detecting an occurrence of a side impact (or that a side impact is unavoidable) and the side at which the side impact occurs (the right side or the left side). The ECU 24 and the sensor 26 may be regarded as being the components of the far side airbag device 10.

The ECU 24 activates the inflator 18 when the sensor 26 detects a side impact (or unavoidable side impact) against the opposite side in the vehicle width direction from the side at which the vehicle seat 12 is disposed (i.e., the far side). The ECU 24 may also activate the inflator 18 when the sensor 26 detects a side impact (or unavoidable side impact) against the side in the vehicle width direction at which the vehicle seat 12 is disposed (a near side).

—Expansion Limiting Structure—

In the side airbag 20 with the structure described above, the expansion limiting structure 28 is provided to serve as a limiting structure that limits an expansion thickness of the head protection portion 20H. The expansion limiting structure 28 according to this exemplary embodiment is configured to limit the expansion thickness of the head protection portion 20H such that an expansion thickness W1 of an upper portion of the head protection portion 20H (see FIG. 3A) is greater than an expansion thickness W2 of a lower portion of the head protection portion 20H (see FIG. 3B). This is described in specific terms below.

Figure 2:
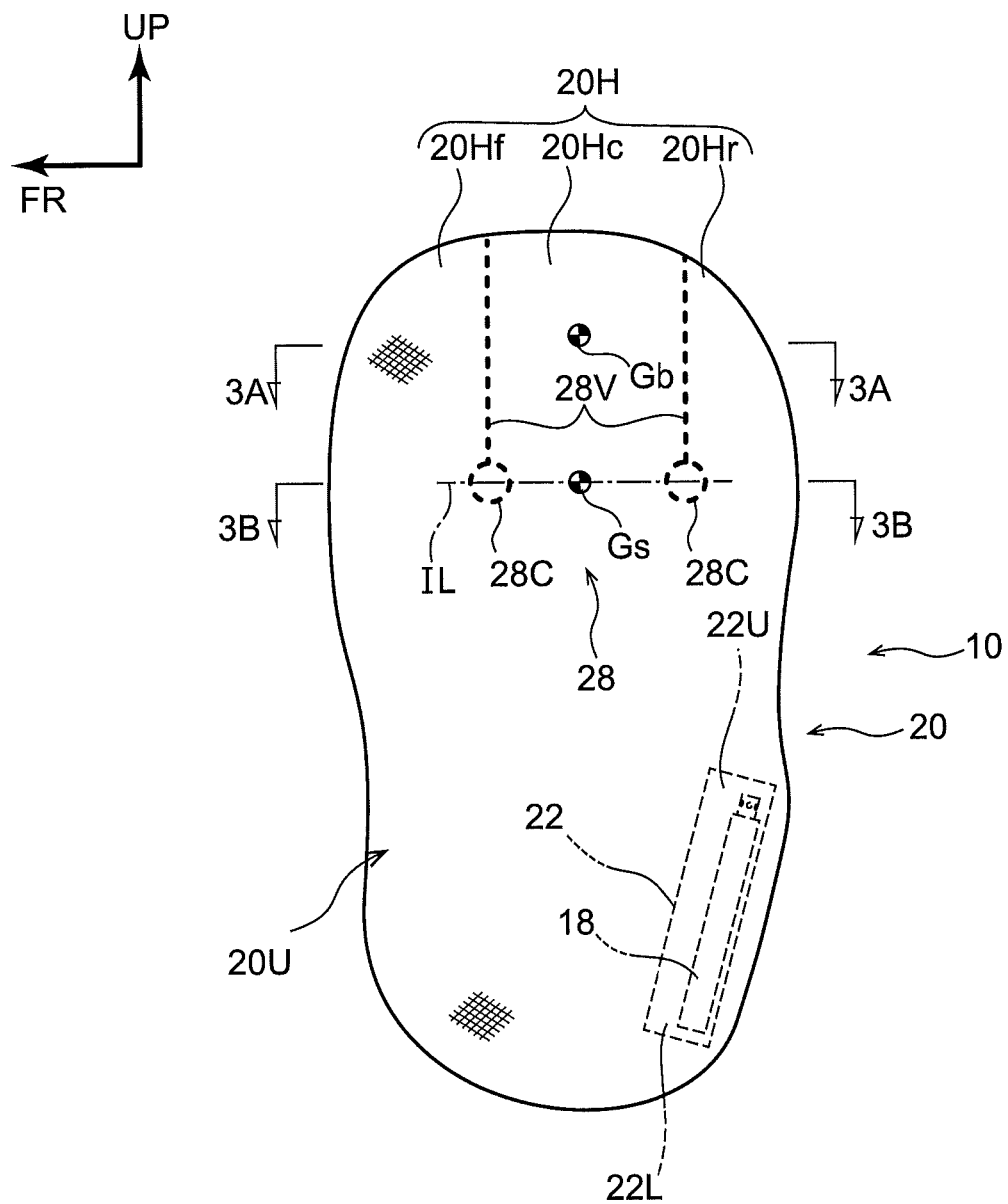
FIG. 2 is a side view of the inflated and expanded state, illustrating the side airbag and an expansion limiting structure that structure the far side airbag device of the first exemplary embodiment.
Figure 3A:
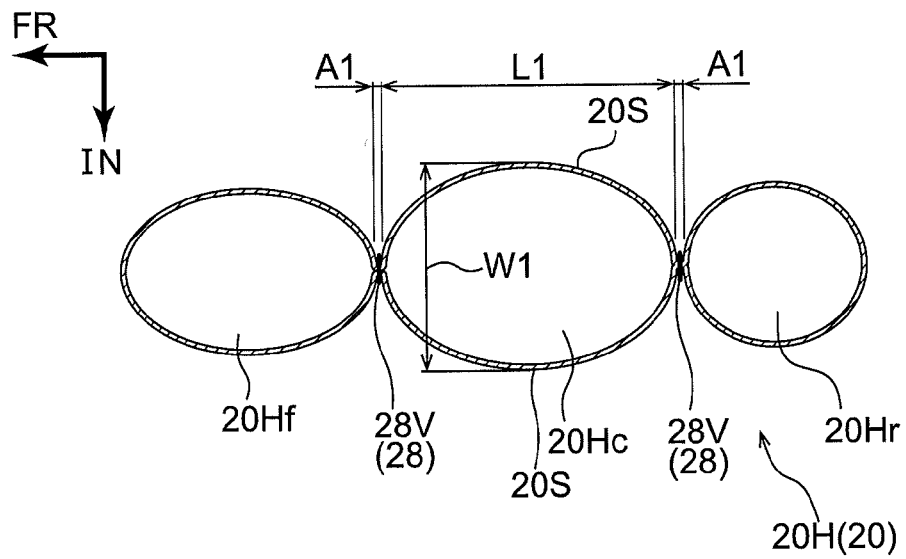
FIG. 3A is a sectional diagram taken along line 3A-3A of FIG. 2, which is a diagram illustrating the side airbag and expansion limiting structure that structure the far side airbag device of the first exemplary embodiment.
Figure 3B:
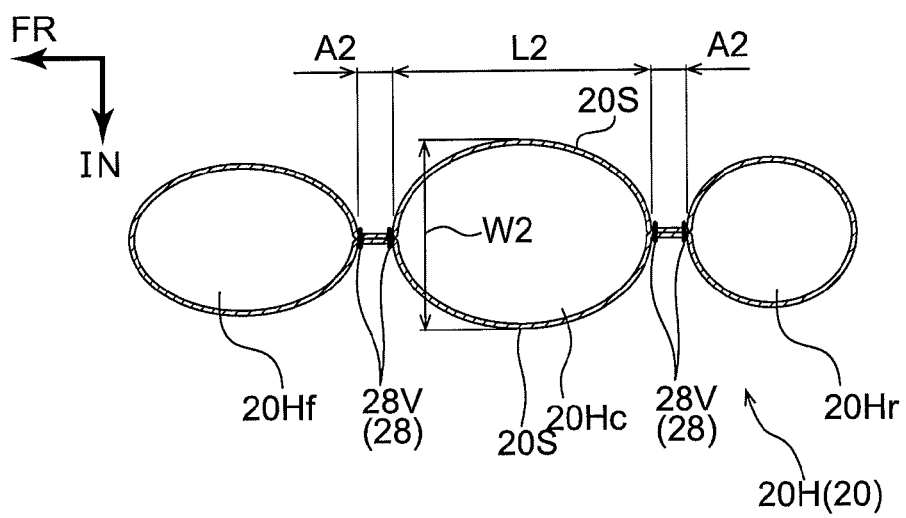
FIG. 3B is a sectional diagram taken along line 3B-3B of FIG. 2, which is a diagram illustrating the side airbag and expansion limiting structure that structure the far side airbag device of the first exemplary embodiment.

As illustrated in FIG. 1 and FIG. 2, the expansion limiting structure 28 includes a front and rear pair of up-and-down (vertical) seams 28V and a pair of circular seams 28C. The circular seams 28C connect with lower end portions of the pair of up-and-down seams 28V. As illustrated in FIG. 3A and FIG. 3B, the up-and-down seams 28V and the circular seams 28C each join side walls 20S at the two vehicle width direction sides of the side airbag 20 to one another by stitching.

The up-and-down seams 28V correspond to a first side wall joining portion of the present disclosure. In this exemplary embodiment, the front and rear pair of up-and-down seams 28V are provided substantially in parallel with one another along the up-down direction, as illustrated in FIG. 2. More specifically, each of the pair of up-and-down seams 28V extends downward from an upper end of the side airbag 20 in side view, and respective lower end positions of the up-and-down seams 28V substantially match in the up-down direction.

Respective upper ends of the pair of circular seams 28C connect with the lower ends of the corresponding up-and-down seams 28V (and lines of extension of the up-and-down seams 28V pass through centers of the circular seams 28C in side view). The pair of circular seams 28C have equal diameters to one another and positions of the circular seams 28C in the up-down direction substantially match one another. Thus, each circular seam 28C joins the side walls 20S to one another over a range A2 in the vehicle front-rear direction that is greater than a range A1 in the vehicle front-rear direction over which each up-and-down seam 28V joins the side walls 20S to one another. The circular seams 28C correspond to a second side wall joining portion of the present disclosure. In the descriptions below, the above-mentioned range A1 and range A2 may be referred to as joining range A1 and joining range A2.

As is described in detail below, the pair of circular seams 28C are disposed at up-down direction positions such that an imaginary line IL joining the centers thereof to one another passes through a center of gravity Gs of a head portion Hs of a small occupant Ps in the side view.

As illustrated in FIG. 3A and FIG. 3B, a portion at the upper end side of the head protection portion 20H is partitioned by the expansion limiting structure 28 described above into a front chamber 20Hf, a central chamber 20Hc and a rear chamber 20Hr that are arranged in the front-rear direction. Of these, as illustrated in FIG. 1, principally the central chamber 20Hc inflates and expands at the vehicle width direction middle side relative to the head H of the occupant P.

A front-to-rear length L2 of a portion of the central chamber 20Hc that is partitioned by the circular seams 28C is shorter than a front-to-rear length L1 of a portion of the central chamber 20Hc that is partitioned by the up-and-down seams 28V (L2<L1). Therefore, the expansion thickness W2 in the vehicle width direction of the portion of the central chamber 20Hc that is partitioned by the circular seams 28C is thinner than the expansion thickness W1 of the portion that is partitioned by the up-and-down seams 28V (W2<W1). The pairs of up-and-down seams 28V and circular seams 28C join the side walls 20S to one another as described above, and correspond to a pair of side wall joining portions of the present disclosure. Each of the pair of circular seams 28C projects to the side thereof at which one of the up-and-down seams 28V connects with the other circular seam 28C. Thus, the circular seams 28C correspond to a separation setting portion of the present disclosure. The circular seams 28C are formed in circular shapes, which are ring shapes, in side view and correspond to ring seams of the present disclosure.

As mentioned above, the pair of circular seams 28C are disposed at the vertical positions such that the imaginary line IL joining the centers thereof to one another passes through the center of gravity Gs of the head portion Hs of the small occupant Ps in the side view. A position of the head protection portion 20H that coincides in the side view with a center of gravity Gb of a head portion Hb of a large occupant Pb is disposed at the upper side relative to a position that coincides in the side view with the center of gravity Gs of the head portion Hs of the small occupant Ps. That is, the side airbag 20 is configured to protect the head portion Hb of a large occupant P with a range in which the expansion thickness is W1 and to protect the head portion Hs of a small occupant P with a range in which the expansion thickness is W2.

In this exemplary embodiment, the stature of a WorldSID (World Side Impact Dummy) AM50 crash test dummy (representing the 50th percentile of American adult males) is assumed as the stature of a large occupant (this dummy is hereinafter referred to as "the AM50 dummy"). The position of the center of gravity of the head of the AM50 dummy seated on the vehicle seat 12 in a standard sitting attitude designated by impact testing regulations may be set as the position of the center of gravity Gb of the head portion Hb.

Meanwhile, the stature of an AF05 crash test dummy (representing the 5th percentile of American adult females) is assumed as the stature of a small occupant (this dummy is hereinafter referred to as "the AF05 dummy"). The position of the center of gravity of the head of the AF05 dummy seated on the vehicle seat 12 in a standard sitting attitude designated by impact testing regulations may be set as the position of the center of gravity Gs of the head portion Hs.

—Operation and Effects—

Now, operation of the first exemplary embodiment is described. Here, operation of the far side airbag device 10 when a side impact occurs at the side (hereinafter referred to as "the far side") in the vehicle width direction that is opposite to the side at which the vehicle seat 12 is disposed is described.

In the far side airbag device 10 with the structure described above, when the inflator 18 is activated by the ECU 24 when there is a side impact against the far side, gas generated by the inflator 18 is supplied through the flow regulation cloth 22 into the side airbag 20. As a result, the upper body protection portion 20U of the side airbag 20 inflates and expands at the vehicle middle side in the vehicle width direction relative to (the chest and abdomen of) the occupant P, and the head protection portion 20H inflates and expands at the vehicle middle side in the vehicle width direction relative to the head H of the occupant P. Thus, movement of the occupant P of the vehicle seat 12 toward the impact side is limited by the side airbag 20. That is, the occupant P is restrained by the side airbag 20 of the far side airbag device 10 and is protected from the side impact against the far side.

In this far side airbag device 10, because the expansion limiting structure 28 is provided at the side airbag 20, the effect on occupant head protection performance of differences in the statures of occupants may be suppressed compared to a comparative example in which the expansion limiting structure 28 is not provided. Below, this comparative example is compared and described (a head protection portion of the side airbag 20 of the comparative example is referred to as a head protection portion 20P).

The side airbags 20 including the head protection portions 20H and 20P have bag shape with large volumes, given that up-down direction dimensions thereof are large. Each of the head protection portions 20H and 20P is disposed to be distant to upward from a lower portion that is supported at the seatback 14 via the inflator 18 and is supported at the vehicle seat 12 via the lower portion of the side airbag 20, that is, the upper body protection portion 20U. In the comparative example, because the expansion limiting structure 28 is not provided, an expansion thickness W3 of the head protection portion 20P of the side airbag 20 is large, as illustrated in FIG. 4B. Therefore, the expansion volume of this side airbag 20 is large and the internal pressure of the side airbag 20 is likely to be lower. Thus, in the comparative example, because the internal pressure during expansion is lower, a support stiffness for the head H from the head protection portion 20P that, as mentioned above, inflates and expands at a distance from its support portion at the vehicle seat 12 is likely to be lower. Moreover, a generated load (reaction) when supporting the head H (absorbing energy therefrom) is likely to be smaller.

In contrast, in the present exemplary embodiment the expansion width, that is, the expansion volume of the head protection portion 20H, is kept smaller by the expansion limiting structure 28 and the internal pressure of the head protection portion 20H is kept higher than in the comparative example. Therefore, the head protection portion 20H that inflates and expands at a distance from its support portion at the vehicle seat 12 is inhibited from folding or tipping relative to the upper body protection portion 20U that is supported at the seatback 14, and the head protection portion 20H may generate a load that is sufficient for energy absorption. That is, the head protection portion 20H assures stiffness in a bending direction and stiffness in a compression direction that are required for appropriate support of the head H (for energy absorption). Therefore, appropriate energy absorption of the head H is achieved in association with support (restraint) of the head H by the head protection portion 20H of the side airbag 20.

An energy absorption amount that is required for the AF05 dummy, that is, for the head portion Hs of the small occupant Ps, is relatively small. Therefore, an appropriate energy absorption for the head portion Hs is achieved by a region of the central chamber 20Hc of the head protection portion 20H (around the center of gravity Gs) with a relatively small expansion thickness. That is, a region that protects the head portion Hs, which has a relatively small inertia when there is a collision, may absorb energy from the head portion Hs appropriately (without applying an excessive load) in a short impact absorption stroke. Therefore, the expansion thickness W2 may be kept small, contributing to an improvement in internal pressure (stiffness).

On the other hand, an energy absorption amount that is required for the head portion Hb of the large occupant Pb (the inertia when there is a collision) is larger than that required for the head portion Hs of the small occupant Ps. In the present exemplary embodiment, a region of the central chamber 20Hc of the head protection portion 20H that inflates and expands at the vehicle width direction middle side relative to the head portion Hb has a relatively large expansion thickness. Thus, the energy absorption stroke is longer than for the region that protects the head portion Hs of the small occupant Ps. Therefore, energy may be appropriately absorbed (without applying an excessive load) from the head portion Hb that has large inertia during a collision.

Thus, in the far side airbag device 10 according to the first exemplary embodiment, a high internal pressure of the head protection portion 20H is assured when a head H is being restrained by the expansion limiting structure 28, which contributes to an improvement in protection performance for the head H. Furthermore, because the expansion thickness is made different at respective positions in the up-down direction of the head protection portion 20H in accordance with the statures of occupants P, suitable protection performance for the head H that accords with the stature of an occupant P may be provided. Therefore, as described above, the far side airbag device 10 may suppress the effect of differences in the statures of occupants on occupant head protection performance compared to the comparative example in which the expansion limiting structure 28 is not provided. In other words, the far side airbag device 10 has a high robustness of head protection with respect to differences in the statures of occupants.

Figure 4A:
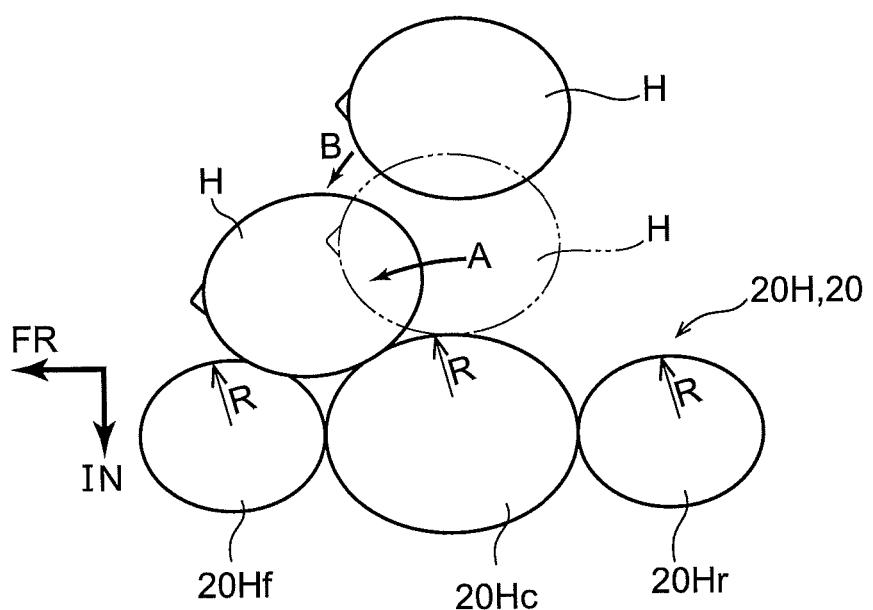
FIG. 4A is a plan view schematically illustrating an example of a mode of protection of the head of an occupant by the far side airbag device of the first exemplary embodiment.
Figure 4B:
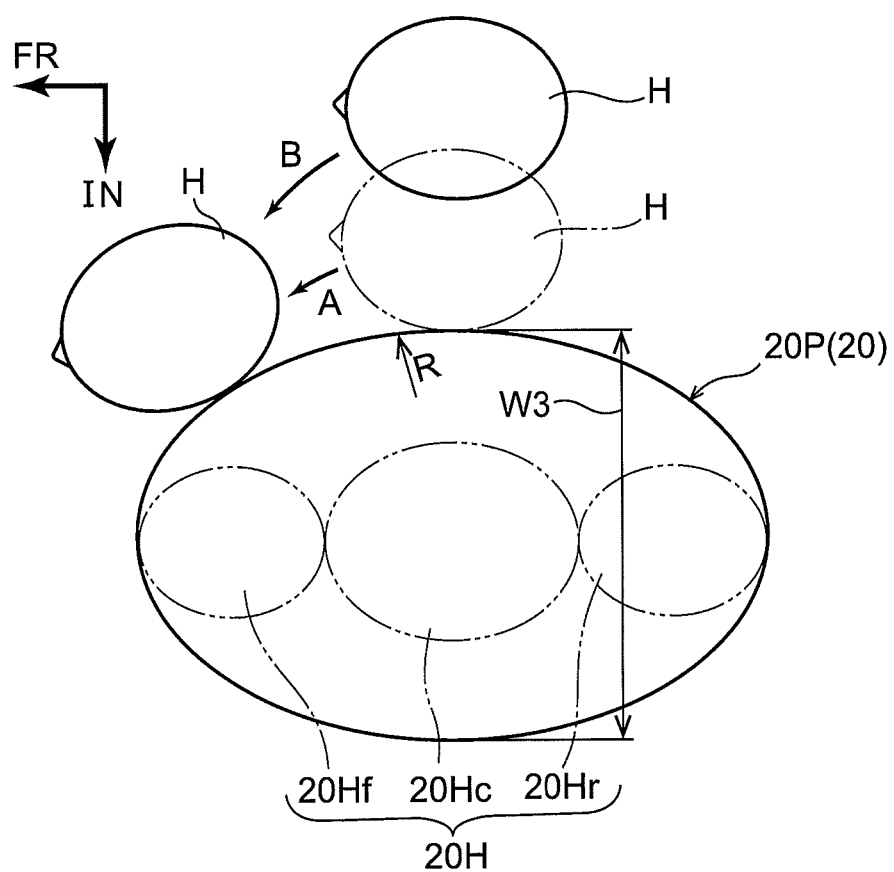
FIG. 4B is a plan view schematically illustrating an example of a mode of protection of the head of an occupant by a far side airbag device of a comparative example.

Furthermore, as illustrated in FIG. 4A and FIG. 4B, the head protection portion 20H of the far side airbag device 10 is partitioned into the front chamber 20Hf, the central chamber 20Hc and the rear chamber 20Hr, and radiuses of curvature R formed by the side walls 20S are small. That is, the expansion thicknesses W1 and W2 of the central chamber 20Hc are kept much smaller than the expansion thickness W3 of the head protection portion 20P of the side airbag 20 according to the comparative example. Therefore, the head protection portion 20H of the side airbag 20 is inflated and expanded to a shape that is more appropriate for protection of the head H than in the comparative example. Thus, protection performance for the head H of the occupant P is improved by a different mechanism in addition to the operational effects described above.

To be specific, because the expansion thickness W3 of the head protection portion 20P of the comparative example that is not partitioned in the front-rear direction is large, the radius of curvature R of a contact surface of the head protection portion 20P with the head H is large, as illustrated in FIG. 4B. Therefore, a head H coming into contact with the head protection portion 20P is likely to slide forward relative to the head protection portion 20H (see arrow A). When this sliding occurs, it is more difficult to achieve sufficient energy absorption from the head H. As a further example, it is also difficult to achieve sufficient energy absorption from the head H if the head H of the occupant P collides in a state of moving diagonally forward (see arrow B) due to inertia (a pole impact, a diagonal impact, a micro-wrap impact or the like).

In contrast, in the present exemplary embodiment as illustrated in FIG. 4A, the head protection portion 20H is partitioned into the plural chambers with small radiuses of curvature R. Therefore, even if there is sliding of the head H against the central chamber 20Hc or the head H is moving diagonally forward due to inertia, the head H may be securely retained by the central chamber 20Hc and the front chamber 20Hf, and appropriate energy absorption from the head H may be achieved. Even if the head H of the occupant P is moving diagonally rearward due to inertia, appropriate energy absorption from the head H may be achieved in a similar manner, though switched from front to rear.

The expansion limiting structure 28 limits the expansion thickness of the head protection portion 20H with the up-and-down seams 28V. The expansion limiting structure 28 sets the difference in expansion thicknesses between the region that protects the head portion Hs of the small occupant Ps and the region that protects the head portion Hb of the large occupant Pb by the difference between the joining ranges A2 and A1 of the side walls 20S to one another according to the circular seams 28C and the up-and-down seams 28V. Thus, the expansion limiting structure 28 is constituted with a simple structure. Moreover, the expansion limiting structure 28 is constituted with the front and rear pair of up-and-down seams 28V and the front and rear pair of circular seams 28C as principal portions thereof. Therefore, compared to, for example, a structure in which only each one of the up-and-down seams 28V and the circular seams 28C are provided, the inflated and expanded state of the head protection portion 20H is easily expanded to a shape with small radiuses of curvature R as described above, that is, a suitable shape for appropriate protection of the head H. Furthermore, because the front and rear pair of up-and-down seams 28V are provided to be substantially parallel with one another, the head protection portion may be expanded to a suitable shape for the protection of a head with an even simpler structure.

Considered from a different perspective, the expansion limiting structure 28 limits the expansion thicknesses of the head protection portion 20H with the front and rear pair of the up-and-down seams 28V. The expansion limiting structure 28 sets the difference in expansion thicknesses of the region that protects the head portion Hs of the small occupant Ps and the region that protects the head portion Hb of the large occupant Pb with (the dimensions and arrangement of) the pair of circular seams 28C. Thus, the expansion limiting structure 28 is constituted with a simple structure. Moreover, the expansion thicknesses of the head protection portion 20H are limited by the separation of the pair of up-and-down seams 28V, and the difference in expansion thicknesses between the region that protects the head portion Hs of the small occupant Ps and the region that protects the head portion Hb of the large occupant Pb is set by the separation of the pair of circular seams 28C. When the up-and-down seams 28V with terminal ends (lower ends in the present exemplary embodiment) in the side walls 20S of the side airbag 20 are provided, there may be concentrations of stress at the terminal ends. Thus, the circular seams 28C that are provided may be utilized to moderate concentrations of stress at the terminal ends and to set expansion thicknesses that accord with the statures of occupants P.

—Variant Examples of the First Exemplary Embodiment—

Below, variant examples of the expansion limiting structure with a pair of up-and-down seams are described.

—First Variant Example—

Figure 5A:
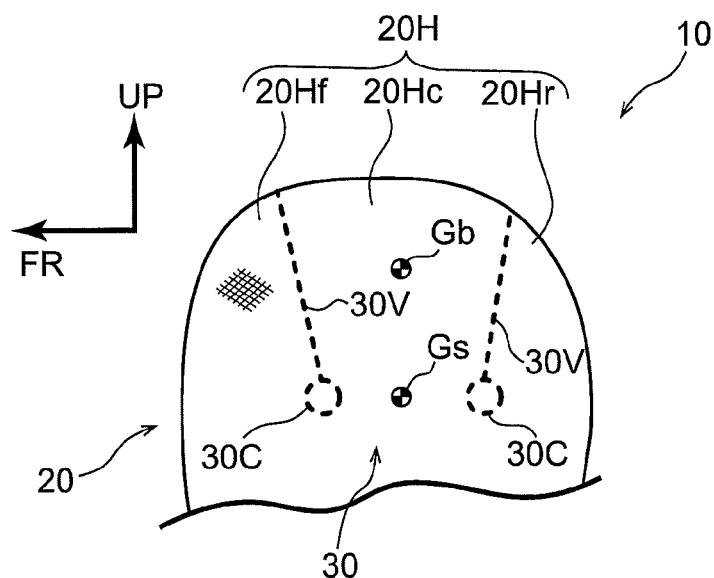
FIG. 5A is a side view illustrating a first variant example of the expansion limiting structure of the far side airbag device of the exemplary embodiment.

In a first variant example illustrated in FIG. 5A, an expansion limiting structure 30 is employed instead of the expansion limiting structure 28. The expansion limiting structure 30 includes a pair of up-and-down seams 30V instead of the front and rear pair of up-and-down seams 28V that extend in parallel with one another along the up-down direction. The separation between the pair of up-and-down seams 30V in the front-rear direction is smaller at the lower end side thereof than at the upper end side. In the present variant example, the up-and-down seams 30V are angled in opposite directions to one another with respect to the up-down direction. The expansion limiting structure 30 also includes a pair of circular seams 30C that connect with the lower ends of the up-and-down seams 30V.

The up-and-down seams 30V correspond to the first side wall joining portion of the present disclosure. The circular seams 30C connect with the up-and-down seams 30V at positions such that lines of extension of the corresponding up-and-down seams 30V pass through the centers of the circular seams 30C in side view. The circular seams 30C join the side walls 20S to one another over joining ranges A2 that are greater in the vehicle front-rear direction than joining ranges A1 by the up-and-down seams 30V. Thus, the circular seams 30C correspond to the second side wall joining portion of the present disclosure. The pairs of up-and-down seams 30V and circular seams 30C join the side walls 20S to one another as described above and correspond to a front and rear pair of side wall joining portions of the present disclosure. Each of the pair of circular seams 30C projects to the side thereof at which one of the up-and-down seams 30V connects with the other of the circular seams 30C. Thus, the circular seams 30C correspond to the separation setting portion and the ring seams of the present disclosure.

The angled arrangement in which the spacing between the up-and-down seams 30V is narrower at the lower end side than at the upper end side may be understood as corresponding to the separation setting portion and a seam arrangement structure of the present disclosure. Therefore, the circular seams 30C are not limited to functioning as the separation setting portion. Thus, a configuration may be employed in which, for example, each of the circular seams 30C connects with the lower end of the corresponding up-and-down seam 30V in a tangential direction at the opposite side of the up-and-down seam 30V from the side thereof at which the other of the up-and-down seams 30V is disposed, or the like. That is, the expansion limiting structure 30 may be structured independently of the dimensions, shapes, arrangement and the like of the circular seams 30C. Furthermore, the pair of up-and-down seams 30V are not limited to structures that are inclined symmetrically to one another with respect to the up-down direction. For example, just one of the up-and-down seams 30V may be inclined. As another example, the inclination angles thereof may be different from one another.

—Second Variant Example—

Figure 5B:
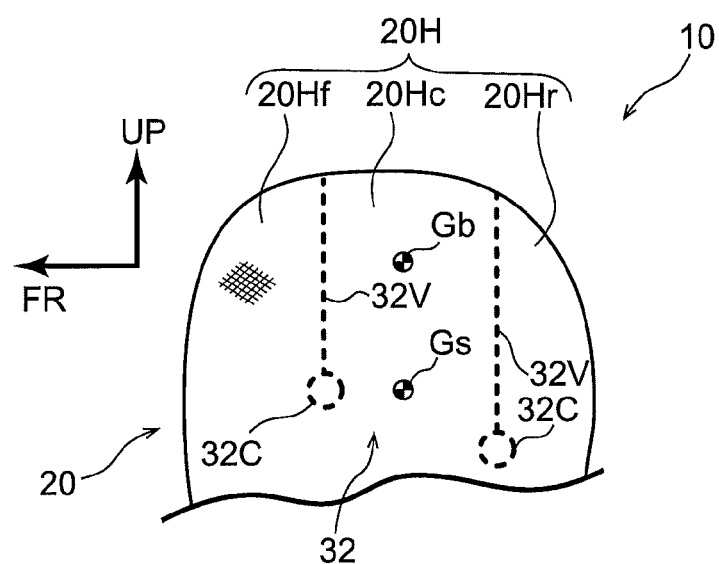
FIG. 5B is a side view illustrating a second variant example of the expansion limiting structure of the far side airbag device of the exemplary embodiment.

In a second variant example illustrated in FIG. 5B, an expansion limiting structure 32 is employed instead of the expansion limiting structure 28. Instead of the front and rear pair of up-and-down seams 28V, the positions of the lower ends of which in the up-and-down direction substantially coincide, the expansion limiting structure 32 includes a pair of up-and-down seams 32V, the up-down direction positions of the lower ends of which are different from one another. In the present variant example, the lower end of the up-and-down seam 32V at the front side is disposed upper relative to the lower end of the up-and-down seam 32V at the rear side. The expansion limiting structure 32 also includes a pair of circular seams 32C that connect with the lower ends of the up-and-down seams 32V. In the present variant example, a position in the up-down direction of the center of the circular seam 32C at the front side substantially coincides with an up-down direction position of the center of gravity Gs of the head portion Hs of the small occupant Ps (the AF05 dummy).

The up-and-down seams 32V correspond to the first side wall joining portion of the present disclosure. The circular seams 32C connect with the up-and-down seams 32V at positions such that lines of extension of the corresponding up-and-down seams 32V pass through the centers of the circular seams 32C in side view. The circular seams 32C join the side walls 20S to one another over joining ranges A2 that are greater in the vehicle front-rear direction than joining ranges A1 by the up-and-down seams 32V. Thus, the circular seams 32C correspond to the second side wall joining portion of the present disclosure. The pairs of up-and-down seams 32V and circular seams 32C join the side walls 20S to one another as described above and correspond to the pair of front and rear side wall joining portions of the present disclosure. Each of the pair of circular seams 32C projects to the side thereof at which one of the up-and-down seams 32V connects with the other of the circular seams 32C. Thus, the circular seams 32C correspond to the separation setting portion and the ring seams of the present disclosure.

The configuration in which the lower end of the up-and-down seam 32V at the front side is disposed at the upper side relative to the lower end of the up-and-down seam 32V at the rear side is not limiting. For example, a configuration is possible in which the lower end of the up-and-down seam 32V at the rear side is disposed upper relative to the lower end of the up-and-down seam 32V at the front side. Further, the configuration in which the up-down direction position of the circular seam 32C that connects with the up-and-down seam 32V whose lower end is disposed at the upper side (which is vertically shorter) substantially coincides with the up-down direction position of the center of gravity Gs of the head portion Hs is not limiting. For example, a configuration is possible in which the up-down direction position of the circular seam 32C that connects with the up-and-down seam 32V whose lower end is disposed at the lower side (which is vertically longer) substantially coincides with the up-down direction position of the center of gravity Gs of the head portion Hs. As a further example, a structure is possible in which an imaginary line joining the front and rear circular seams 32C passes through the center of gravity Gs of the head portion Hs.

=Alternative Exemplary Embodiments=

Now, alternative exemplary embodiments of the present disclosure are described. Configurations and operations that are basically the same as in the first exemplary embodiment or preceding embodiments are assigned the same reference symbols as in the first exemplary embodiment or preceding embodiment and description thereof or illustration in the drawings may be omitted.

=Second Exemplary Embodiment=

Figure 6:
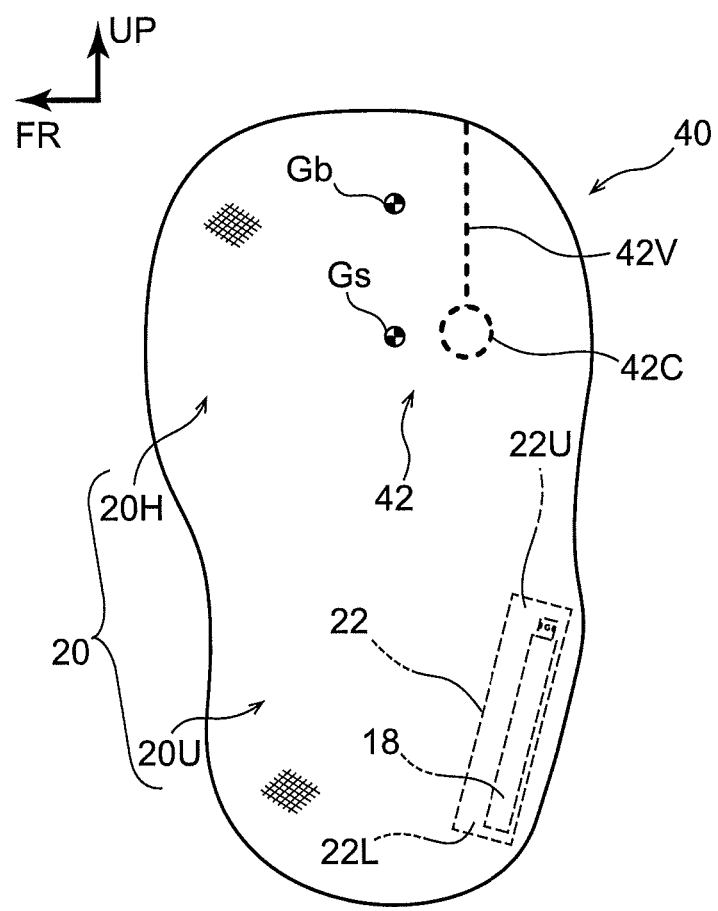
FIG. 6 is a side view, corresponding to FIG. 2, illustrating a side airbag and expansion limiting structure that structure a far side airbag device of a second exemplary embodiment of the present disclosure.

A far side airbag device 40 according to a second exemplary embodiment is described in accordance with FIG. 6. FIG. 6 illustrates the far side airbag device 40 according to the second exemplary embodiment in a schematic side view corresponding to FIG. 2. As illustrated in FIG. 6, the far side airbag device 40 differs from the far side airbag device 10 in that an expansion limiting structure 42 is provided instead of the expansion limiting structure 28 with the respective front and rear pairs of the up-and-down seams 28V and the circular seams 28C.

The expansion limiting structure 42 includes one each of an up-and-down seam 42V and a circular seam 42C. The circular seam 42C connects with a lower end of the up-and-down seam 42V. In the present exemplary embodiment, a position of the center of the circular seam 42C in the up-down direction substantially coincides with the up-down direction position of the center of gravity Gs of the head portion Hs of the small occupant Ps (the AF05 dummy). Consequently, a portion at the upper end side of the head protection portion 20H, which is not illustrated in the drawings, is partitioned into two chambers arranged in the front-rear direction.

The up-and-down seam 42V extends in the vertical direction and joins the side walls 20S to one another, and corresponds to the first side wall joining portion of the present disclosure. The circular seam 42C connects with the lower end of the up-and-down seam 42V at a position such that a line of extension of the up-and-down seam 42V passes through the center of the circular seam 42C in side view. The circular seam 42C joins the side walls 20S to one another over a joining range A2 that is greater in the vehicle front-rear direction than a joining range A1 of the up-and-down seam 42V. Thus, the circular seam 42C corresponds to the second side wall joining portion of the present disclosure. Other structures of the far side airbag device 40, including portions that are not illustrated in the drawings, are configured similarly to the corresponding structures of the far side airbag device 10.

Thus, according to the far side airbag device 40, the same effects may be provided by the same operations as in the far side airbag device 10, apart from operational effects that are due to the up-and-down seams and circular seams being provided as pairs at front and rear.

=Third Exemplary Embodiment=

Figure 7:
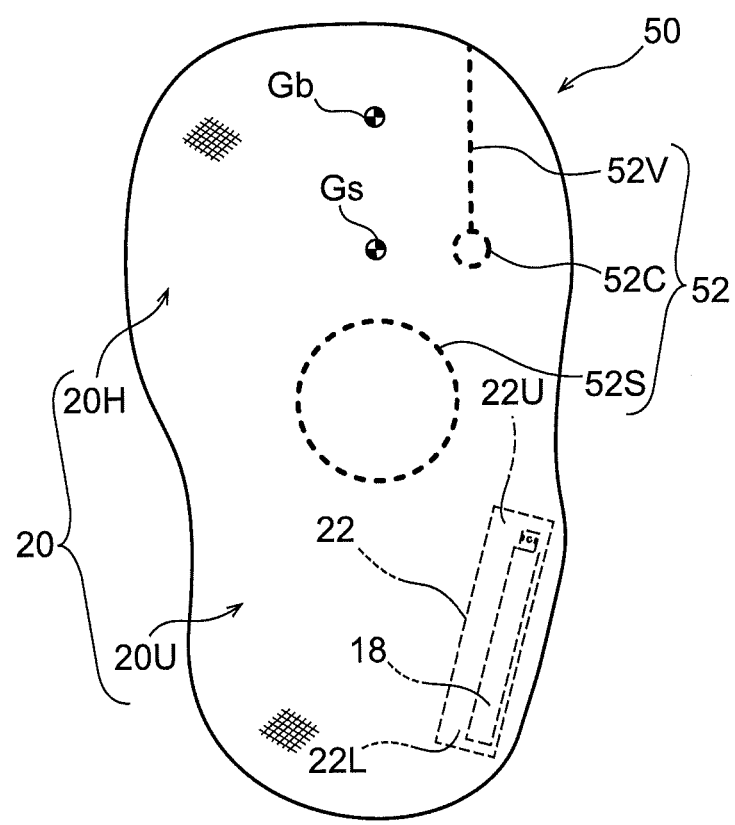
FIG. 7 is a side view, corresponding to FIG. 2, illustrating a side airbag and expansion limiting structure that structure a far side airbag device of a third exemplary embodiment of the present disclosure.

A far side airbag device 50 according to a third exemplary embodiment is described in accordance with FIG. 7. FIG. 7 illustrates the far side airbag device 50 according to the third exemplary embodiment in a schematic side view corresponding to FIG. 2. As illustrated in FIG. 7, the far side airbag device 50 differs from the far side airbag device 40 in that an expansion limiting structure 52 is provided instead of the expansion limiting structure 42 with the circular seam 42C.

The expansion limiting structure 52 includes an up-and-down seam 52V and a circular seam 52C, with similar structures to the up-and-down seam 42V and circular seam 42C that constitute the expansion limiting structure 42, and a shoulder seam 52S that serves as a third side wall joining portion. The up-and-down seam 52V extends in the vertical direction and joins the side walls 20S to one another, and corresponds to the first side wall joining portion of the present disclosure. The circular seam 52C connects with the lower end of the up-and-down seam 52V at a position such that a line of extension of the up-and-down seam 52V passes through the center of the circular seam 52C in side view. The circular seam 52C joins the side walls 20S to one another over a joining range A2 that is greater in the vehicle front-rear direction than the joining range A1 of the up-and-down seam 52V. Thus, the circular seam 52C corresponds to the second side wall joining portion of the present disclosure.

The shoulder seam 52S is formed in a circular shape or an ellipsoid shape in side view (a circular shape in the example illustrated in the drawing). The shoulder seam 52S is a non-inflating and non-expanding portion of a region of the side airbag 20 that expands at the vehicle width direction middle side relative to the shoulder of an occupant P. The shoulder seam 52S has the function of separately limiting the expansion thickness of the side airbag 20. The shoulder seam 52S, along with the circular seam 52C (and the up-and-down seam 52V), sets a difference in expansion thicknesses between the region that protects the head portion Hs of the small occupant Ps and the region that protects the head portion Hb of the large occupant Pb. Other structures of the far side airbag device 50, including portions that are not illustrated in the drawings, are configured similarly to the corresponding structures of the far side airbag device 10.

Thus, according to the far side airbag device 50, the same effects may be provided by the same operations as in the far side airbag device 10, apart from operational effects that are due to the up-and-down seams and circular seams being provided as pairs at front and rear.

In addition, with the expansion limiting structure 52, the head protection portion 20H is easily expanded into a shape that is more suitable for protecting the head portions Hs and Hb compared to the expansion limiting structure 42 according to the second exemplary embodiment that does not include the shoulder seam 52S that serves as the third side wall joining portion.

=Variant Examples of the Third Exemplary Embodiment=

Below, a variant example of the expansion limiting structure, including the third side wall joining portion, is described.

—Third Variant Example—

Figure 8A:
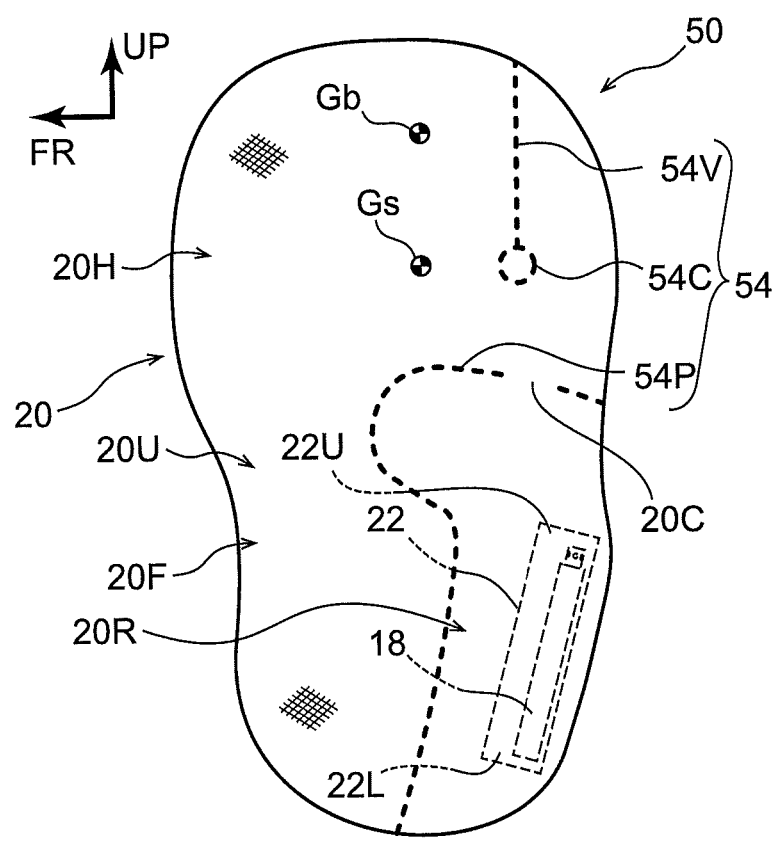
FIG. 8A is a side view illustrating a third variant example of the expansion limiting structure of the far side airbag device of the exemplary embodiment.

In a third variant example illustrated in FIG. 8A, an expansion limiting structure 54 is employed instead of the expansion limiting structure 52. The expansion limiting structure 54 includes an up-and-down seam 54V and a circular seam 54C, with similar structures to the up-and-down seam 52V and circular seam 52C that constitute the expansion limiting structure 52, and a partition seam 54P that serves as the third side wall joining portion, which is provided instead of the shoulder seam 52S. The up-and-down seam 54V extends in the vertical direction and joins the side walls 20S to one another, and corresponds to the first side wall joining portion of the present disclosure. The circular seam 54C connects with the lower end of the up-and-down seam 54V at a position such that a line of extension of the up-and-down seam 54V passes through the center of the circular seam 54C in side view. The circular seam 54C joins the side walls 20S to one another over a joining range A2 that is greater in the vehicle front-rear direction than the joining range A1 of the up-and-down seam 54V. Thus, the circular seam 54C corresponds to the second side wall joining portion of the present disclosure.

The partition seam 54P partitions the side airbag 20 into a rear expansion portion 20R and a front expansion portion 20F. The rear expansion portion 20R principally inflates and expands at the vehicle width direction middle side relative to rear portions of the torso and abdomen of an occupant P, and the front expansion portion 20F principally inflates and expands at the vehicle width direction middle side relative to front portions of the torso and abdomen and to the head H of the occupant P. Thus, in the side airbag 20 according to the variant example, a rear portion of the upper body protection portion 20U is structured by the rear expansion portion 20R, and a front portion of the upper body protection portion 20U and the head protection portion 20H are structured by the front expansion portion 20F. In this variant example, a protrusion portion 20Rp that protrudes forward relative to other portions of the rear expansion portion 20R is provided at the rear expansion portion 20R so as to inflate and expand at the vehicle width direction middle side relative to the shoulder of the occupant P. Configurations in which the protrusion portion 20Rp is not provided are also applicable.

In this variant example, the inflator 18 and the flow regulation cloth 22 are disposed inside the rear expansion portion 20R. Gas that has been supplied from the inflator 18 into the rear expansion portion 20R passes through a communication passage 20C, which is specified as a non-continuous portion (a non-stitched portion) of the partition seam 54P, and is supplied into the front expansion portion 20F. Therefore, the side airbag 20 is a configuration in which the rear expansion portion 20R is inflated and expanded with a relatively higher internal pressure than the front expansion portion 20F.

In the side airbag 20 that is formed thus, the internal pressure of the head protection portion 20H, which is a portion of the front expansion portion 20F, tends to be lower than in a configuration that does not include the partition seam 54P. Therefore, the effect of internal pressure of the head protection portion 20H being maintained by the expansion limiting structure 54 makes a larger contribution to head protection performance.

—Fourth and Fifth Variant Examples—

Figure 8B:
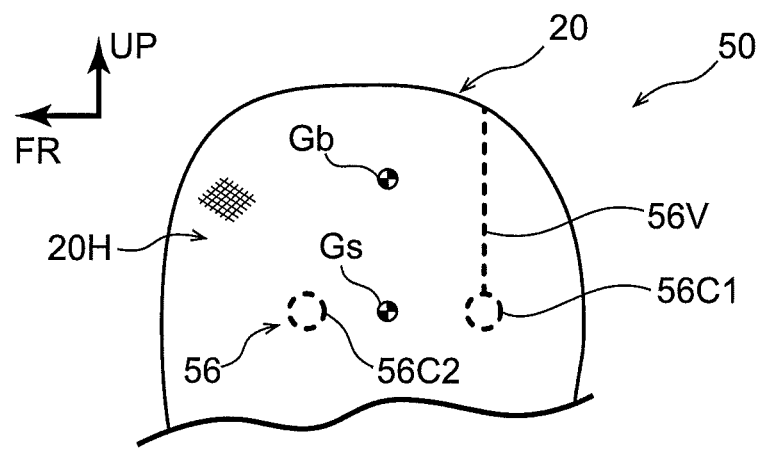
FIG. 8B is a side view illustrating a fourth variant example of the expansion limiting structure of the far side airbag device of the exemplary embodiment.

In a fourth variant example illustrated in FIG. 8B, an expansion limiting structure 56 is employed instead of the expansion limiting structure 52. The expansion limiting structure 56 includes an up-and-down seam 56V and a circular seam 56C1, with similar structures to the up-and-down seam 52V and circular seam 52C that constitute the expansion limiting structure 52, and a circular seam 56C2 that serves as the third side wall joining portion, which is provided instead of the shoulder seam 52S. The up-and-down seam 56V extends in the vertical direction and joins the side walls 20S to one another, and corresponds to the first side wall joining portion of the present disclosure. The circular seam 56C1 connects with the lower end of the up-and-down seam 56V at a position such that a line of extension of the up-and-down seam 56V passes through the center of the circular seam 56C1 in side view. The circular seam 56C1 joins the side walls 20S to one another over the joining range A2 that is greater in the vehicle front-rear direction than the joining range A1 of the up-and-down seam 56V. Thus, the circular seam 56C1 corresponds to the second side wall joining portion of the present disclosure.

The circular seam 56C2 is disposed forward of the circular seam 56C1, such that the center of gravity Gs of the head portion Hs of the small occupant Ps (the AF05 dummy) is disposed between the circular seam 56C2 and the circular seam 56C1. That is, the circular seam 56C2 is disposed at substantially the equivalent position in the vertical direction to the circular seam 56C1.

Figure 8C:
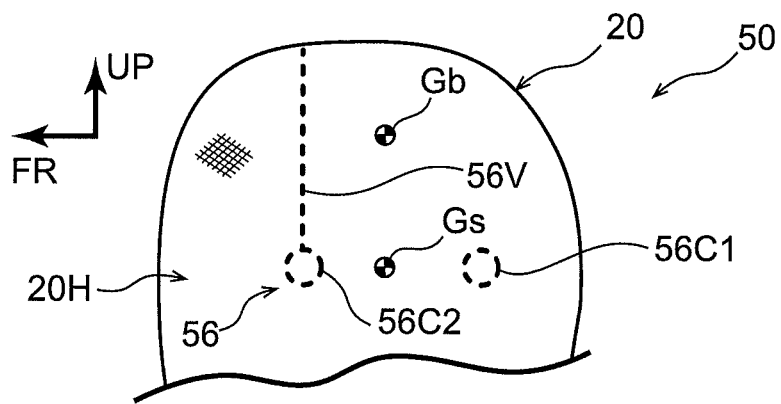
FIG. 8C is a side view illustrating a fifth variant example of the expansion limiting structure of the far side airbag device of the exemplary embodiment.

A structure is possible in which, as in the fifth variant example illustrated in FIG. 8C, the up-and-down seam 56V is provided to connect with the circular seam 56C2 at the front side instead of the up-and-down seam 56V that connects with the circular seam 56C1 at the rear side. In this case, the circular seam 56C2 at the front side corresponds to the second side wall joining portion and the circular seam 56C1 at the rear side corresponds to the third side wall joining portion.

—Alternative Variant Examples—

In the third exemplary embodiment, examples of the expansion limiting structure 52 and the like are illustrated in which the shoulder seam 52S or the like serving as the third side wall joining portion is combined with the structure that includes the single up-and-down seam 52V or the like and circular seam 52C or the like. However, the present disclosure is not limited thus. For example, a configuration is possible in which an expansion limiting structure with a structure in accordance with the first exemplary embodiment or a variant example thereof includes any of the shoulder seam 52S, the partition seam 54P or the circular seam 56C2. Furthermore, in this variant example and the above-described third to fifth variant examples, the third side wall joining portion may be configured by a combination of several elements selected from the shoulder seam 52S, the partition seam 54P and the circular seam 56C2.

—Fourth Exemplary Embodiment—

Figure 9A:
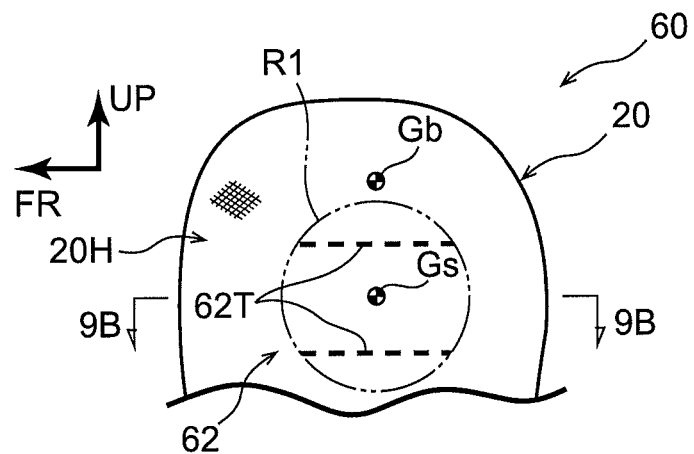
FIG. 9A is a side view illustrating an upper portion of a side airbag and an expansion limiting structure of a far side airbag device of a fourth exemplary embodiment of the present disclosure.
Figure 9B:
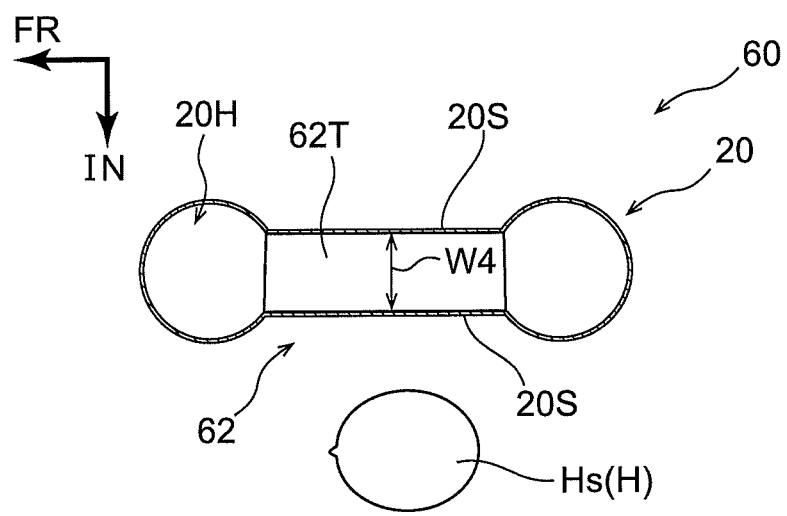
FIG. 9B is a sectional diagram taken along line 9B-9B of FIG. 9A.

A far side airbag device 60 according to a fourth exemplary embodiment of the present disclosure is described in accordance with FIG. 9A and FIG. 9B. FIG. 9A illustrates the far side airbag device 60 according to the fourth exemplary embodiment in a schematic side view corresponding to FIG. 2. As illustrated in FIG. 9A, the far side airbag device 60 is provided with an expansion limiting structure 62 based on a tether 62T instead of the expansion limiting structure 28, 30, 32, 42, 52, 54 or 56 based on seams.

The expansion limiting structure 62 includes an upper and lower pair of tethers 62T that extend in the front-rear direction. Each tether 62T joins the side walls 20S of the side airbag 20 to one another, thus limiting the expansion thickness of the side airbag 20. The tether 62T at the upper side is disposed to pass between the center of gravity Gb of the head portion Hb of the large occupant Pb (the AM50 dummy) and the center of gravity Gs of the head portion Hs of the small occupant Ps (the AF05 dummy). The tether 62T at the lower side is disposed to pass below the center of gravity Gs of the head portion Hs of the small occupant Ps (the AF05 dummy).

As a result, as illustrated in FIG. 9B, an expansion thickness W4 of a region of the side airbag 20 that is disposed between the upper and lower tethers 62T, which is to say a region that protects the head portion Hs of the small occupant Ps, is kept smaller than in other regions (sections of which are not illustrated in the drawings). The expansion thickness W4 is equivalent to a width of the tethers 62T. A region in which the expansion thickness is less than a predetermined expansion thickness because of the tethers 62T is referred to as region R1, illustrated by the imaginary lines in FIG. 9A. The upper end of region R1 is lower relative to the center of gravity Gb of the head portion Hb of the large occupant Pb. Other structures of the far side airbag device 60, including portions that are not illustrated in the drawings, are configured similarly to the corresponding structures of the far side airbag device 10.

Thus, according to the far side airbag device 60, the same effects may be provided by the same operations as in the far side airbag device 10, apart from operational effects that are due to an expansion limiting structure being structured to include an up-and-down seam and a circular seam. In addition, in the far side airbag device 60, regions whose expansion thicknesses are greater than W4 are disposed to front and rear of the region in which the expansion thickness is W4, as illustrated in FIG. 9B. Therefore, sliding or diagonal movement forward or rearward of the head portion Hs of the small occupant Ps at this region may be suppressed. As a result, appropriate energy absorption from the head portion Hs is realized. In particular, with the structure in which two of the tethers 62T are provided, upper and lower, a shape similar to the shape illustrated in FIG. 9B may be extended to the protection range for the head portion Hb of the large occupant Pb and contribute to appropriate energy absorption from the head portion Hb of the large occupant Pb.

=Variant Examples of the Fourth Exemplary Embodiment=

Below, a variant example of the expansion limiting structure, including the third side wall joining portion, is described.

—Sixth Variant Example—

Figure 10:
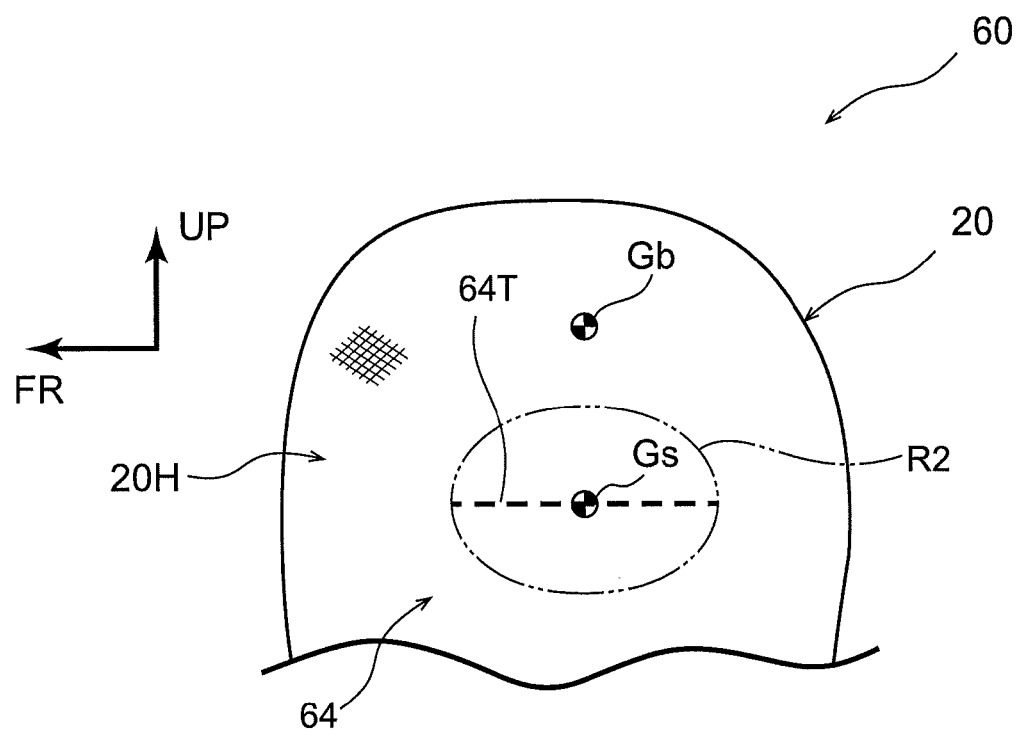
FIG. 10 is a side view illustrating a sixth variant example of the expansion limiting structure of the far side airbag device of the exemplary embodiment.

In a sixth variant example illustrated in FIG. 10, an expansion limiting structure 64 is employed instead of the expansion limiting structure 62. The expansion limiting structure 64 includes a single tether 64T extending in the front-rear direction. The tether 64T joins the side walls 20S of the side airbag 20 to one another, thus limiting the expansion thickness of the side airbag 20. The tether 64T is disposed to pass through the center of gravity Gs of the head portion Hs of the small occupant Ps (the AF05 dummy). Thus, the expansion thickness of a region of the side airbag 20 in which the tether 64T is disposed, which is to say the region that protects the head portion Hs of the small occupant Ps, is kept smaller than in other regions. In the sixth variant example, a region in which the expansion thickness is less than a predetermined expansion thickness because of the tether 64T is referred to as region R2, illustrated by the imaginary lines in FIG. 10. Region R2 is narrower up-and-down than region R1 of the fourth exemplary embodiment.

=Variant Examples of the Exemplary Embodiments=

—Seventh Variant Example—

Figure 11:
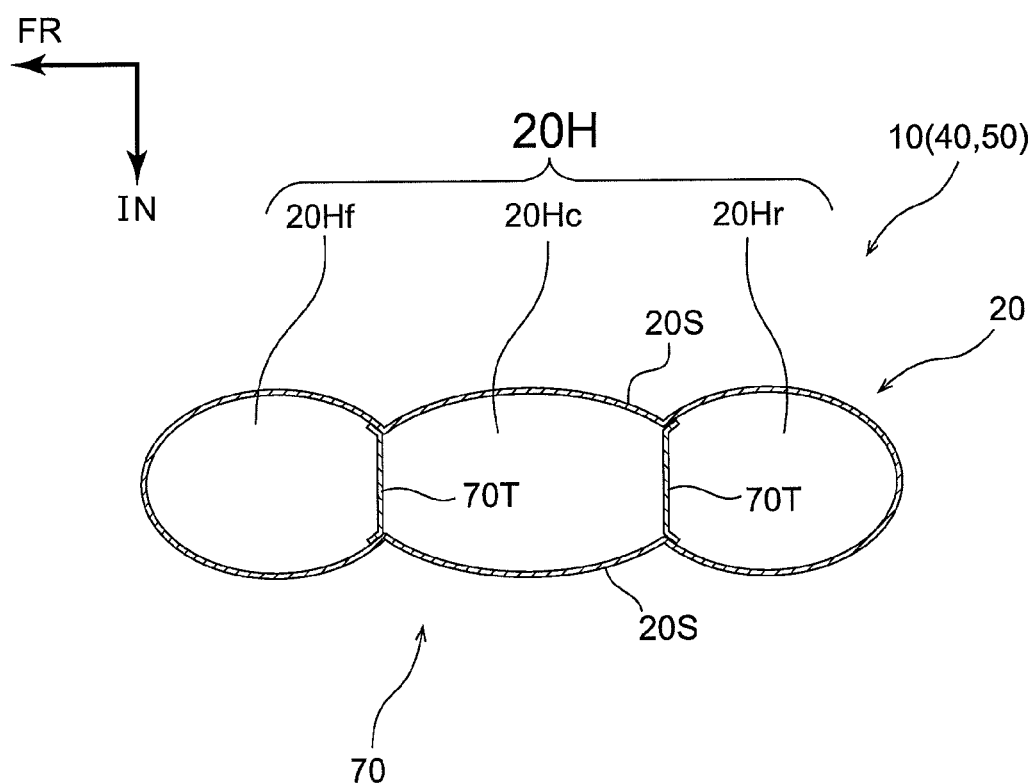
FIG. 11 is a sectional diagram illustrating a seventh variant example of the expansion limiting structure of the far side airbag device of the exemplary embodiment.

In the first to third exemplary embodiments, examples are illustrated in which the expansion limiting structures 28, 30, 32, 42, 52, 54 and 56 include the up-and-down seams 28V and the like and the circular seams 28C and the like, but the present disclosure is not limited thus. For example, as illustrated in FIG. 11, an expansion limiting structure 70 may be employed that includes up-and-down tethers 70T that serve as the first side wall joining portion or the side wall joining portion extending in the up-down direction.

In a configuration in which the up-and-down tethers 70T correspond to the first side wall joining portion, a tether or the like corresponding to the second side wall joining portion, which connects with the lower ends of the up-and-down tethers 70T, is provided. As this tether, the lower ends of the up-and-down tethers 70T may be inflected, or a joining width in the front-rear direction of the pair of side walls to one another may be larger than a joining width due to the up-and-down tethers 70T.

In a configuration in which the up-and-down tethers 70T correspond to the side wall joining portion, a configuration that corresponds to the separation setting portion is provided. As this configuration, the lower ends of the up-and-down tethers 70T may be inflected, or the up-and-down tethers 70T may be disposed to be angled in the manner of the up-and-down seams 30V.

—Alternative Variant Examples—

In the first to third exemplary embodiments and the variant examples, examples are illustrated in which the up-and-down seams 28V or the like of the expansion limiting structure 28, 30, 32, 42, 52, 54 or 56 reach from the upper end of the side airbag 20 to the circular seams 28C or the like, but the present disclosure is not limited thus. For example, the upper ends of the up-and-down seams 28V may be disposed at the lower side relative to the upper end of the side airbag 20.

In the first to third exemplary embodiments and the variant examples, examples are illustrated in which the up-and-down seams 28V or the like of the expansion limiting structure 28, 30, 32, 42, 52, 54 or 56 are a front and rear pair or a single seam, but the present disclosure is not limited thus. For example, an expansion limiting structure may include three or more of the up-and-down seams 28V or the like.

In the first to third exemplary embodiments and the variant examples, examples are illustrated in which the expansion limiting structures 28, 30, 32, 42, 52, 54 and 56 include the circular seams 28C and the like that serve as the second side wall joining portion, the separation setting portion and the ring seams, but the present disclosure is not limited thus. For example, expansion limiting structures may include seams that are closed up in fragmented shapes, ellipsoid shapes and polygonal shapes in side view to serve as the second side wall joining portion, the separation setting portion and the ring seams.

In the exemplary embodiments and variant examples described above, examples are illustrated in which the side airbag 20 includes the upper body protection portion 20U that inflates and expands at the vehicle width direction middle side relative to the chest and abdomen of an occupant, but the present disclosure is not limited thus. It is sufficient if the side airbag of the present disclosure inflates and expands at the vehicle width direction middle side relative to the chest and head of an occupant. For example, the upper body protection portion 20U may not include a region that inflates and expands at the vehicle width direction middle side relative to the abdomen of an occupant P.

In the exemplary embodiments and variant examples described above, examples are illustrated in which the inflator 18 is activated when there is a side impact against the far side relative to the vehicle seat 12, but the present disclosure is not limited thus. For example, the inflator 18 may be activated by the ECU 24 when there is a micro-wrap impact in which another vehicle collides with the vehicle at a vehicle width direction outer end portion of the far side, a diagonal impact in which another vehicle collides with the vehicle at the far side from diagonally forward, or the like.

In the exemplary embodiments and variant examples described above, examples are illustrated in which the inflator 18 and the flow regulation cloth 22 are provided to serve as gas supply means, but the present disclosure is not limited thus. For example, the inflator 18 may be provided to serve as the gas supply means but the flow regulation cloth 22 may be omitted.

In the exemplary embodiments and variant examples described above, examples are illustrated in which the present disclosure is applied at the driver seat or the passenger seat, but the present disclosure is not limited thus. For example, the present disclosure may be applied to seats in a second or subsequent row in which left and right seats are disposed apart in the vehicle width direction (separate-type seats).

It will be clear that the present disclosure may be embodied with numerous modifications within a scope that does not depart from the spirit of the present disclosure. For example, the structures (elements) of the exemplary embodiments and variant examples described above may be combined or substituted.

What is claimed is:

1. A far side airbag device comprising:
a side airbag that is configured to receive a gas supply and, while being supported at a seatback of a seat, expand and inflate at a vehicle width direction middle side relative to a range at least from a chest to a head of an occupant of the seat; and
a limiting structure that is configured to limit a thickness in the vehicle width direction of the side airbag in an inflated and expanded state such that a region that inflates and expands at the vehicle width direction middle side relative to a head of a small occupant is thinner than a region that inflates and expands at the vehicle width direction middle side relative to a head of a large occupant, wherein the limiting structure comprises
a first side wall joining portion that extends in a vehicle up-down direction in the inflated and expanded state of the side airbag and joins vehicle width direction side walls of the side airbag to one another;
a second side wall joining portion that connects with a lower end of the first side wall joining portion and joins the side walls to one another over a larger range in a vehicle front-rear direction than the first side wall joining portion; and
a third side wall joining portion that joins the side walls to one another at a location that is distant from the first side wall joining portion and the second side wall joining portion, the third side wall joining portion arranged to divide a rear volume from a front volume, the rear volume receiving the gas supply so as to expand and inflate at a higher pressure than the front volume, the first and second side wall joining portions arranged in the front volume.

2. The far side airbag device according to claim 1, wherein the limiting structure comprises a tether that extends in a vehicle front-rear direction and joins vehicle width direction side walls of the side airbag to one another in a region that is configured to inflate and expands at the vehicle width direction middle side relative to the head of a small occupant.

3. The far side airbag device according to claim 1, wherein a central position of the second side wall joining portion in a side view is configured to be disposed at a position in an up-down direction that corresponds with a center of gravity of the head of a small occupant.

4. The far side airbag device according to claim 1, wherein the third side wall joining portion is formed by a seam between the side walls.

* * * * *